US008918472B2

(12) United States Patent  (10) Patent No.: US 8,918,472 B2
DellaFera et al.  (45) Date of Patent:  Dec. 23, 2014

(54) METHOD AND SYSTEM FOR MANAGING ELECTRONIC MAIL

(75) Inventors: Ciaran A. DellaFera, Cambridge, MA (US); Tom O. Rojahn, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 13/562,392

(22) Filed: Jul. 31, 2012

(65) Prior Publication Data

US 2012/0297000 A1  Nov. 22, 2012

Related U.S. Application Data

(63) Continuation of application No. 12/332,038, filed on Dec. 10, 2008, now Pat. No. 8,280,965.

(51) Int. Cl.
*G06F 15/16* (2006.01)
*G06Q 10/10* (2012.01)

(52) U.S. Cl.
CPC .................................. *G06Q 10/107* (2013.01)
USPC ........................... 709/206; 709/202; 709/203

(58) Field of Classification Search
CPC ...... G06Q 10/107; G06Q 10/10; H04L 51/12; H04L 12/585; H04L 67/24
USPC ......................................... 709/206, 202, 203
See application file for complete search history.

(56) References Cited

U.S. PATENT DOCUMENTS

| 6,052,709 | A | 4/2000 | Paul |
| 6,249,807 | B1 | 6/2001 | Shaw et al. |
| 6,453,327 | B1 | 9/2002 | Nielsen |
| 6,684,238 | B1 | 1/2004 | Dutta |
| 6,725,228 | B1 | 4/2004 | Clark et al. |
| 7,624,146 | B1 | 11/2009 | Brogne et al. |
| 7,693,944 | B2 | 4/2010 | Appelman |
| 7,783,715 | B2 | 8/2010 | Muller |
| 2002/0023136 | A1 | 2/2002 | Silver et al. |
| 2002/0099681 | A1 | 7/2002 | Gainey et al. |
| 2002/0147778 | A1 | 10/2002 | Dutta |
| 2003/0014490 | A1 | 1/2003 | Bates et al. |
| 2003/0023692 | A1 | 1/2003 | Moroo |
| 2004/0114735 | A1 | 6/2004 | Arning et al. |
| 2004/0230642 | A1* | 11/2004 | Collet et al. ................... 709/200 |
| 2004/0249896 | A1 | 12/2004 | Wantanabe et al. |
| 2005/0132010 | A1 | 6/2005 | Muller |
| 2005/0223064 | A1* | 10/2005 | Salerno et al. ................. 709/206 |
| 2005/0228864 | A1 | 10/2005 | Robertson |
| 2005/0267937 | A1 | 12/2005 | Daniels et al. |

(Continued)

OTHER PUBLICATIONS

Microsoft. "Recall or replace an email message that you sent." Published Nov. 3, 2006. pp. 1-3.*

(Continued)

*Primary Examiner* — Nicholas Taylor (74) *Attorney, Agent, or Firm* — George R. McGuire; Bond Schoeneck & King, PLLC; John Pivnichny (57) ABSTRACT

A method and system for managing email between a sender and a recipient wherein the method and system provide the recipient with control over routing an email message, wherein the control includes predefining directions to be performed upon the receipt of an email message, and wherein the directions are dependent upon the properties of the email message. The recipient may enable or disable the control at any time.

12 Claims, 5 Drawing Sheets

(56) References Cited

U.S. PATENT DOCUMENTS

| | | |
|---|---|---|
| 2006/0010213 A1 | 1/2006 | Mehta |
| 2007/0038717 A1 | 2/2007 | Burkholder et al. |
| 2007/0061401 A1 | 3/2007 | Bodin et al. |
| 2007/0238474 A1 | 10/2007 | Ballas |
| 2008/0104175 A1 | 5/2008 | Keohane et al. |
| 2008/0104177 A1* | 5/2008 | Keohane et al. ............. 709/206 |
| 2008/0168145 A1* | 7/2008 | Wilson ......................... 709/206 |
| 2008/0288601 A1* | 11/2008 | Keohane et al. ............. 709/206 |

OTHER PUBLICATIONS

IBM, Method to Detect Out of Office Agent Activation in Email, Nov. 19, 2004, http://www.ip.com/publicview/IPCOM000032962D.

12332038—PDF from public pair of parent case, U.S. Appl. No. 12/332,038 as of Aug. 30, 2012.

* cited by examiner

METHOD AND SYSTEM FOR MANAGING ELECTRONIC MAIL

REFERENCE TO RELATED APPLICATION

The present application is a continuation of and claims priority to Applicant's co-pending U.S. patent application Ser. No. 12/332,038, filed Dec. 10, 2008, now allowed, the entirety of which is hereby incorporated by reference.

FIELD OF INVENTION

The present invention relates generally to computer systems and in particular to electronic mail (email) functions in computer systems. More particularly, the present invention relates to the management of email.

BACKGROUND

Electronic mail, often abbreviated to e-mail, email, or originally eMail, is a store-and-forward method of writing, sending, receiving and saving messages over electronic communication systems. The term "e-mail" applies to systems including: (i) internet email systems based on the Simple Mail Transfer Protocol; (ii) network systems based on other protocols: and/or (iii) to various mainframe-based, minicomputer-based, or internet-based systems using protocols particular to a systems vendor or on the same protocols used on public networks.

Email is a widely utilized communication tool in the computer network environment. Email is an especially critical business tool for communication in large, geographically-distributed organizations. These large organizations are frequently challenged by the task of keeping track of personnel who are available to work or respond to issues as the issues arise. These issues are oftentimes communicated from one person to the other within the organization via email and the recipient of the email is then expected to respond to or resolve the issue.

To help email senders know which email receivers are available to work or to respond to issues sent via email, most email systems contain an "out-of-office" notification function. This function alerts an email sender if the recipient is not going to be checking email for a specific period of time, perhaps due to an illness or a vacation, and often includes a return date or end date. Sending email to a recipient who has enabled the out-of-office notification function causes the email system to send a return email (an "out-of-office responsive email communication") in response to a received email (the "sent-by-sender email communication"). This out-of-office responsive email communication is generally sent from the recipient's email system back to the sender of the sent-by-sender email communication. The receipt of the out-of-office responsive email communication can help the sender realize, depending upon circumstances, that the sender may need to take other actions relating to the substantive content of the sent-by-sender email communication due to the apparent temporary unavailability of the recipient of that email message. For example, if the sender's email contains time sensitive information that must be handled before the recipient's return date, the sender might choose to re-route the request of the sent-by-sender email communication to another person within the organization so that time sensitive issues are reliably handled in a timely manner.

With the present out-of-office notification function, the sender often does not remember the recipient's return date or may not be given a return date, and the sender may periodically send additional sent-by-sender type email communications to the recipient, only to cause additional out-of-office responsive email communications to be sent back. This is particularly true when a recipient has set the out-of-office function to be operative for an extended period of time. If the sender has time-sensitive communication that must be addressed and there is a second or backup person (other than the out-of-office recipient) who is capable of responding to the sender's email request, the sender may lose valuable time through the redundant actions of resending and repeatedly receiving multiple out-of-office notifications before taking appropriate action.

Moreover, email recipients may experience an overflow of received email communications in their emailboxes after only a few days of the out-of-office function being used, because the recipient generally has limited or non-existent access to his emailbox and therefore cannot take actions (such as deleting emails) to counter the build-up of received email communications. Very few prior art methods focus on management of mailboxes with the objective of reducing the amount of emails filling up the recipient's mailbox. Most prior art email management solutions focus on archiving and redistribution of incoming emails and result in producing more stored email communications, which serves to exacerbate potential emailbox overflow type problems.

An example of one prior art email retraction system is set forth in U.S. Publication No. US2005/0223064 ("Salerno"), which is hereby incorporated by reference in its entirety. The Salerno system provides an email sender the option of retracting his sent message. This retraction can occur locally before the sent-by-sender email is sent, as well as at the server side, but this retraction option is based exclusively on the unilateral decision of the sender under the logic of the Salerno system.

SUMMARY

There remains a need to provide recipients of emails with methods and systems to control the build-up or excess of email in one's mailbox.

According to one embodiment of the present invention, a method of managing email between a sender and a recipient is provided wherein the method provides the recipient with control over routing an email message, wherein the control comprises predefining directions to be performed upon the receipt of an email message, and wherein the directions are dependent upon the properties of the email message. The recipient may enable or disable the control at any time.

In a further aspect of the method, the properties of the email message may include the recipient's position in the addressee fields, a word or words in the subject field, and/or whether the recipient is the sole receiver of the email or is one or many receivers of the email. The addressee fields may include the "To:," "Cc:," and "Bcc:" fields. The word or words in the subject field include(s) a word or words that match(es) a word or words preselected by the recipient, such as, but not limited to, "urgent," "confidential," or "fyi."

In another aspect of the method, the directions include providing one or more options to the sender of the email, such as, (a) allowing the sender to send the email message; (b) allowing the sender to retract the email message; (c) allowing the sender to forward the email message to a different media predefined by the recipient; and/or (d) allowing the sender to forward the email message to a second recipient.

Examples of different media include, but are not limited to, a private email address, short message service (SMS), voice mail, or virtual private network (VPN). The directions may be performed upon receipt of the email message at the recipient's email server.

In yet another aspect, the method may further include the recipient sending an out-of-office message to the sender.

In another embodiment of the present invention, a system for managing email between a sender and a recipient is provided including at least one server for sending and receiving email, wherein the server is structured and programmed to provide the recipient with control over routing an email message, wherein the control comprises predefining directions to be performed upon the receipt of an email message, and wherein the directions are dependent upon the properties of the email message.

In a further aspect of the system, the server is structured and programmed to define the properties to include the recipient's position in the addressee fields, a word or words in the subject field that match(es) a word or words preselected by the recipient, such as "urgent," "confidential," or "fyi," and/or whether the recipient is the sole receiver of the email or is one or many receivers of the email. The addressee fields can include "To:," "Cc:," and/or "Bcc:"

In another aspect of the system, the server is structured and programmed to provide one or more options to the sender of the email, whereby the options can include, (a) allowing the sender to send the email message; (b) allowing the sender to retract the email message; (c) allowing the sender to forward the email message to a different media predefined by the recipient; and/or (d) allowing the sender to forward the email message to a second recipient.

In yet another embodiment of the present invention, a computer program product encoded in a computer readable medium for instructing a system to manage email between a sender and a recipient, the program code configured to cause the computer to perform the method including providing the recipient with control over routing an email message, wherein the control comprises predefining directions to be performed upon the receipt of an email message, and wherein the directions are dependent upon the properties of the email message.

In another aspect of the computer program product, the properties of the email message can include recipient's position in the addressee fields, wherein the addressee fields include "To:," "Cc:," and/or "Bcc," a word or words in the subject field wherein the word or words match(es) a word or words preselected by the recipient.

In yet a further aspect of the computer program product, the directions can include providing one or more options to the sender of the email, such as, (a) allowing the sender to send the email message; (b) allowing the sender to retract the email message; (c) allowing the sender to forward the email message to a different media predefined by the recipient; and/or (d) allowing the sender to forward the email message to a second recipient.

According to a further aspect of the present invention, email in an email system is managed by a method. The method includes the following steps (not necessarily in the following order: (a) activating, by a recipient user having an email account on the email system, a second chance function at the option of the recipient user; (b) receiving, at an email server of the email system, a first received email; and (c) processing the first received email using the second chance function. The processing step includes the following sub-steps: (a) querying a sender of the first received email regarding retraction of the first received email; (b) receiving a query response from the sender in response to the query; and (c) retraction-related processing comprising one of the following two types of processing: (i) retracting the first received email on condition that the query response indicates that the sender has chosen retraction; or (ii) not retracting the first received email on condition that the query response indicates that the sender has not chosen retraction.

According to a further aspect of the present invention, an email system is for use by a recipient user. The system includes an email server computer. The email server computer includes: an activation module, a receiving module, and a received-email module. The activation module is structured and/or programmed to activate through a communication network, by a recipient user having an email account on the email system, a second chance function at the option of the recipient user. The receiving module is structured and/or programmed to receive a first received email. The received-email processing module is structured and/or programmed to process the first received email using the second chance function. The received-email processing module is further structured and/or programmed to: (i) query, over the communication network, a sender of the first received email regarding retraction of the first received email; (ii) receive, over the communication network, a query response from the sender in response to the query; and (iii) perform retraction-related processing comprising one of the following two types of processing: (a) retracting the first received email on condition that the query response indicates that the sender has chosen retraction; or (b) not retracting the first received email on condition that the query response indicates that the sender has not chosen retraction.

According to a further aspect of the present invention, email software is stored on non-transient storage means and performed by an email server computer. The email software is for use by a recipient user. The email software includes: an activation instruction set, a receiving instruction set and a received-email processing instruction set. The activation instruction set is programmed to activate through a communication network, by a recipient user having an email account on the email system, a second chance function at the option of the recipient user. The receiving instruction set is programmed to receive a first received email. The received-email processing instruction set programmed to process the first received email using the second chance function. The received-email processing instruction set is further programmed to: (i) query, over the communication network, a sender of the first received email regarding retraction of the first received email; (ii) receive, over the communication network, a query response from the sender in response to the query; and (iii) perform retraction-related processing comprising one of the following two types of processing: (a) retracting the first received email on condition that the query response indicates that the sender has chosen retraction; or (b) not retracting the first received email on condition that the query response indicates that the sender has not chosen retraction.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION

Embodiments of the invention provide a system and method for managing and routing of email communications, whereby the managing and routing are controlled, at least in part, by the recipient (as opposed to being exclusively controlled by the sender and/or the inherent design of the email system itself). More specifically, at least some embodiments discussed below include an out-of-office function that enables retraction of email based on choices made by the recipient of the email. Accordingly, if the recipient decides that the sender should be given the option of retracting a message due to the recipient being away on a business or recreational trip, the recipient defines actions and/or functions to be performed in relation to this retraction option that is being authorized by the (prospective) recipient who is going to become unavailable. In this way, the (prospective) recipient can decide to allow retraction, or not allow retraction, depending upon his understanding of the relevant circumstances (such as, length of time without good access to his emailbox, potential for emailbox overflow due to expected volume of received emails, etc.).

The out-of-office function may be enabled by a user (herein sometimes called the "recipient" or "recipient user") when the user expects to be away from the office or is otherwise not expected to be able to access his email. The out-of-office function is governed by a series of decision tables whose values, and consequent control of process flow during email processing, are controlled by the user. The user sets and/or adjusts the decision tables typically through a web-based interface. By setting (or resetting) the values of the decision tables in accordance with user preferences at any given time, that user defines the actions or functions to be performed upon the happening of certain condition(s) (herein called "email-related conditions") related to received emails. As an example of an email-related condition that may be utilized by the user in the setting of decision tables, the user may define different email processing depending upon the email-related condition of whether a sent-by-sender email sent to the recipient has been: (i) sent only to the recipient user as a "single addressee;" or, alternatively, (ii) sent to the recipient user as one addressee out of multiple addressees in the "To:" field of the sent-by-sender email.

Figure 1:
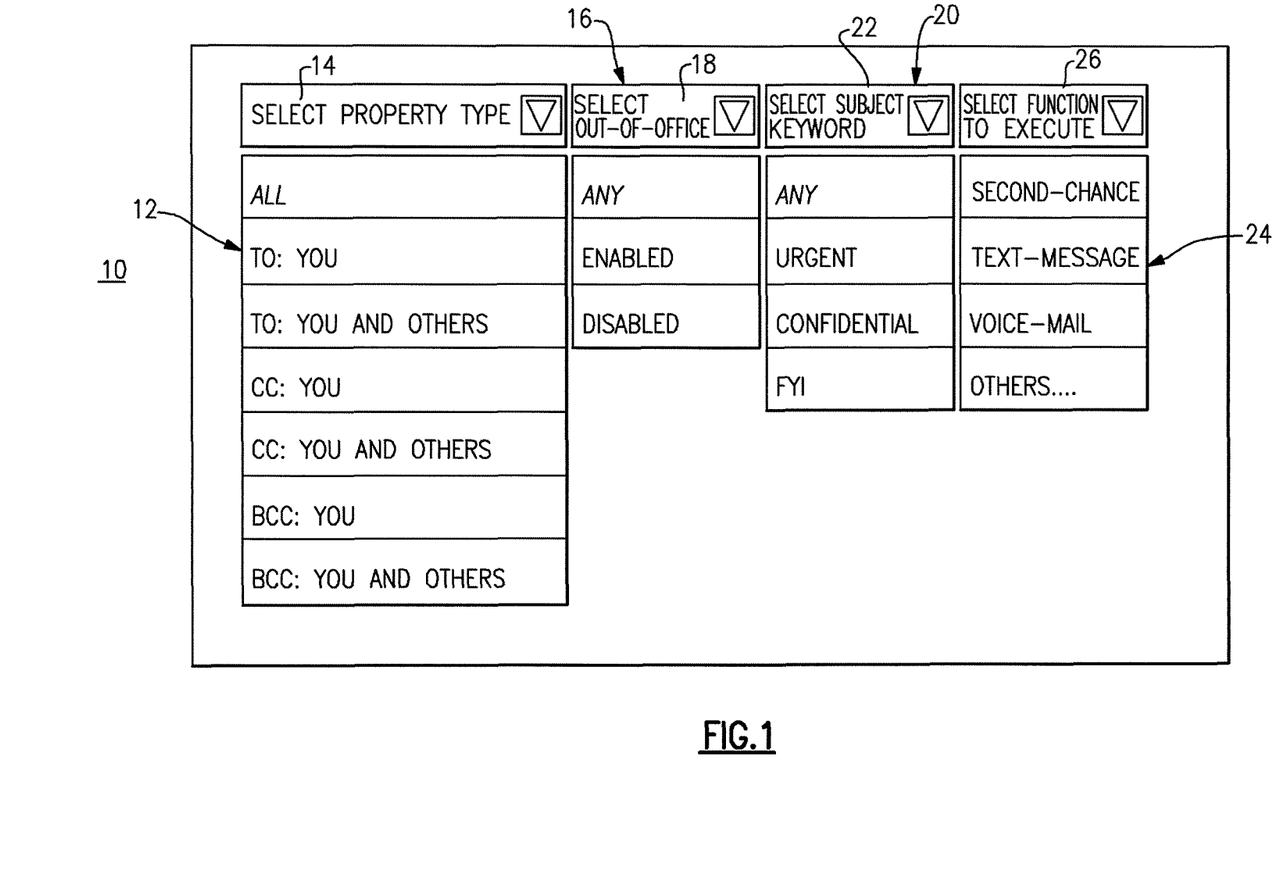
FIG. 1 is a screen shot of a sample web-page with a multiple choice/pull down selection menu used to build decision tables of a system embodiment.

To further explain this function, reference is made to FIG. 1, which displays a sample screen display 10 showing a multiple choice pull-down selection menu for building decision tables. Screen display 10 is also sometimes herein called web page 10 because this particular embodiment of the present invention is a web-based embodiment. More specifically, screen display 10 illustrates how a recipient user determines received-email processing based upon choices made by the user, including choices relating to email-related conditions. When presented with the interface represented by screen display 10, the user selects one option from each column of options 12, 16, 20, 24 in order to define the responsive actions, which will be carried out upon receipt of a sent-by-sender email communication that comes to the recipient user's emailbox. It should be mentioned that the options, option columns and overall layout of screen display 10 is just one example of many possible examples that could be used within the scope of the present invention, and should not be read to limit the options that may used to build decision tables according to the present invention.

The first column 12 of web page 10 provides a list of options for selecting an email-related condition which will herein be called an addressee-positioning condition because it relates to the positioning recipient within the various addressee-related fields of a received email. As is typical of email communications, the possible addressee fields in which a recipient may be positioned on a received email are as follows: (i) "to"; (ii) "cc"; and (iii) "bcc". However, the addressee-positioning condition is a bit more complex than this because it also allows the recipient user to adjust the addressee positioning condition based on whether the recipient user is the only addressee in a given addressee field. As a result the addressee-positioning condition may be chosen by the user to have one, or more, of the following six values: (i) recipient is exclusive addressee in the "to" field; (ii) recipient is one of multiple addressees in the "to" field; (iii) recipient is exclusive addressee in the "cc" field; (iv) recipient is one of multiple addressees in the "cc" field; (v) recipient is exclusive addressee in the "bcc" field; (vi) recipient is one of multiple addressees in the "bcc" field. It is noted that the recipient user may also select the "ALL" option in column 12 so that any chosen email processing (to be discussed below) will happen regardless of the addressee-positioning condition.

As shown in FIG. 1, the column heading 14 is "Select Property Type" which indicates that the recipient user can choose the value of this addressee-positioning condition. To explain the practical significance of the addressee-positioning condition, the recipient addressee's field and/or whether the addressee is solely "you" or "you and others" may indicate the importance or significance of the message. For example, if an email is addressed to "you" in the "to" field then it would be expected to be relatively important, in comparison to a received email that is addressed to "you" in the "cc" or "bcc" fields. This is because in the first hypothetical received email, the primary and only addressee is the recipient user, and in the second hypothetical received email message, the recipient user is merely "copied" or "blind copied". In this way, the selected addressee field of the email recipient of a given received email and the number of addressees in the email ("you" or "you and others") may, at the recipient user's option, be used to determine the decision or action that the user/recipient of the out-of-office function will take.

The next column, column 16, of web page 10 relates to an email-related condition herein called the "out-of-office condition." The recipient user may set the out-of-office condition according to one of three possible values: (i) "enabled," (ii) "disabled," or (iii) "ANY." The "enabled" setting of the out-of office condition means that certain conditional received-email processing (to be further discussed below) will happen only during intervals when the recipient user specifies to the email system that he is out of the office. The "disabled" setting means that the conditional received-email-related processing will only occur during intervals when the recipient user has not specified that he is out of the office. "ANY" means that the conditional email processing will occur regardless of whether the recipient user is in the office or not. This allows the user to control delivery and routing of email messages even if he is in the office. For instance, if the user is in the office, but is not located near his email interface, he has the option to select "ANY" and get re-routing of emails to a device to which he has easy access (this re-routing is one example of a type of received-email processing). Additionally, even if the user is sitting at his desk using his computer, he may want to filter emails that are not as urgent and receive only urgent emails. Thus, he can select the "ALL" option, not enabling or disabling the out-of-office function, but redirecting less urgent emails to another media or address, e.g., another email address, to view at a later time, when he has more time (this is another example of a type of received-email processing). These are two ways to ensure that the recipient user is not interrupted by each and every sent-by-sender email for which he is an addressee.

Column 20 of screen display 10 provides a list "keyword conditions," and this column is headed by "Select Subject Keyword" heading 22. The possible keyword conditions to be chosen by the recipient user are one, or more, of the following: (i) urgent, (ii) confidential, (iii) fyi, and/or (iv) "ANY." In this example, these keywords relate to words that might appear in the subject field of a sent-by-sender email received by the recipient user. As an example of how this keyword condition might be chosen by the user as a practical matter, the user will most likely route emails to a service to which he has immediate access if the subject line of the email has the word "urgent" in contrast to an email that has the word "fyi" in the subject line. These select keywords are mere examples, not limiting the embodiments to only these examples. The user may specify additional keywords to make additional keyword condition choices available in column 20.

The final column of web page 10 is column 24, with the heading 26, indicating select "function" to perform. This column 24 is unlike previously-discussed columns 12, 16 and 18 because it relates to choices regarding received-email processing, as opposed to choices related to email-related conditions. In other words, the previous three columns relate to pre-conditions that may selectively cause special email processing to take place, while column 24 relates to the nature of the special processing that the present invention may provide. This received-email processing is herein sometimes called "functions" or "functions-to-perform". The functions-to-perform listed in column 24 are: (i) second-chance, (ii) text-message, (iii) voice-mail, and (iv) others. The "others" function reflects the fact that the present invention contemplates other types of conditional received-email processing, above and beyond second chance, text message and voice mail functions. Again, these functions are examples and should not be read to limit the present invention in this respect. If the recipient user chooses the second-chance function, then the sender of a sent-by-sender email is provided with the option to retract the email that was sent to the recipient user. If the user selects the text-message function, then the sender may, at the sender's option, send the email as a text message to the recipient user. Similarly, the voice-mail function allows the sender, at the sender's option, to send a voice mail regarding the email contents to the recipient user.

For each of the functions displayed in web page 10, the user may select more than one option under each heading, or may select all options by selecting the "ALL" option under any or all headings. Although column 24 does not explicitly list an "ALL" option, it is possible that the user may select any or all options, if he has access to each and every application.

When multiple options are selected by the recipient user in a given condition choice column (12, 16, 20) or function column (column 24), then the resulting decision table will need to account for the multiple selected condition and/or function options. The following Table 1 sets forth possible property types (that is, condition and/or function choices chosen by the recipient user) and the corresponding meaning of each property types. The properties are not limited to these attributes, but they will be typically used by most users.

TABLE 1

| 1 | To: You | Ordinary email addressed to a single recipient |
| 2 | To: You and others | Ordinary email addressed to a recipient in a group |

TABLE 1-continued

| 3 | Cc: You | Ordinary email addressed to a single recipient as a copy |
| 4 | Cc: You and others | Ordinary email addressed to a recipient in a group as a copy |
| 5 | Bcc: You | Ordinary email addressed to a single recipient as an undisclosed copy |
| 6 | Bcc: You and others | Ordinary email addressed to a recipient in a group as an undisclosed copy |
| 7 | Urgent | An email addressed to the recipient in the form 1-6 and marked with "Urgent" in the Subject-field |
| 8 | Confidential | An email addressed to the recipient in the form 1-6 and marked with "Confidential" in the Subject-field |
| 9 | FYI | An email addressed to the recipient in the form 1-6 and marked with "FYI" in the Subject-field |

Figure 2:
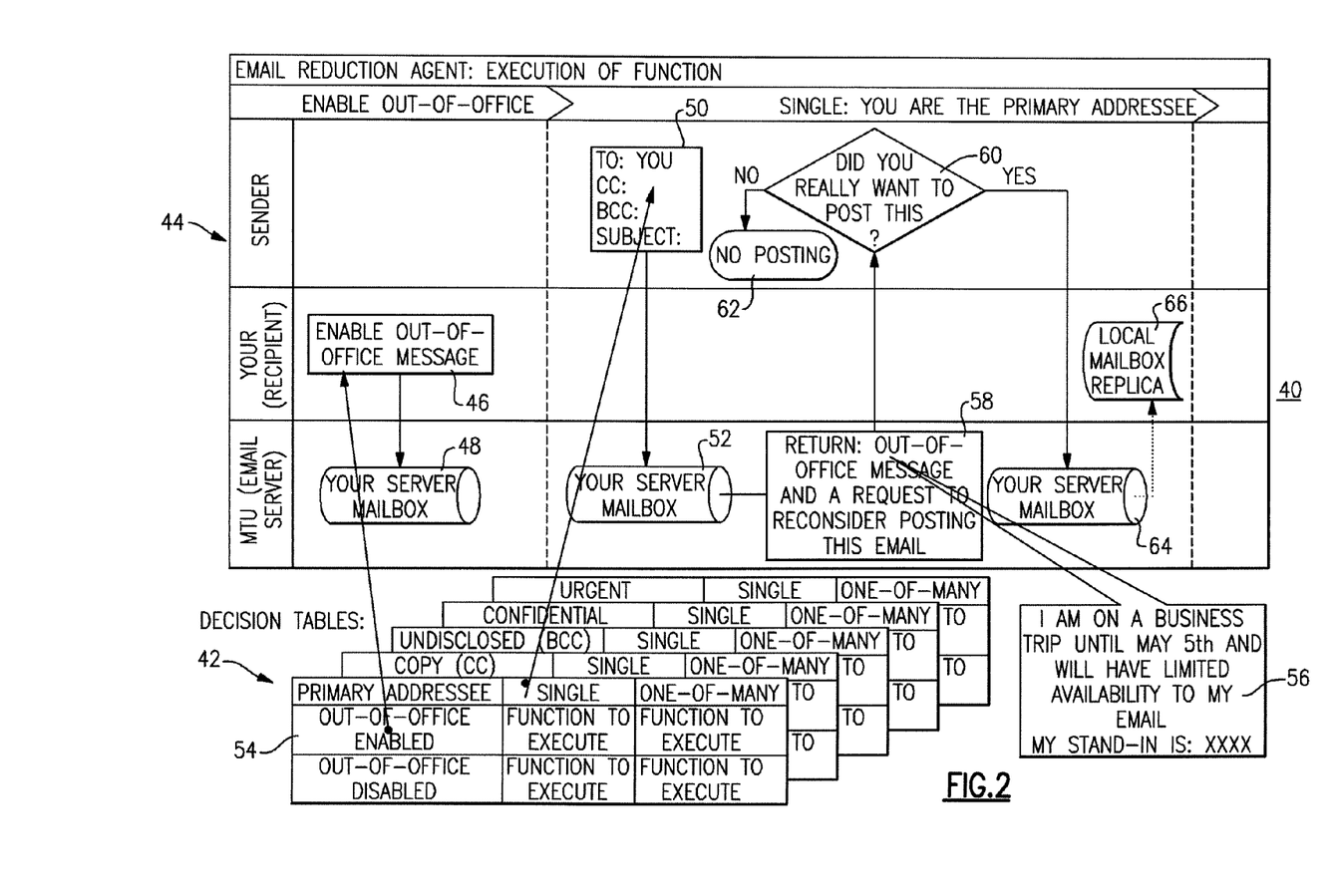
FIG. 2 is a schematic diagram representing a system and/or method embodiment.

Web page 10 allows the user/recipient to select those conditions and/or functions that will allow the recipient user to specify how the out-of-office application will operate on a going-forward basis. Web page 10 activates and/or modifies a set of decision tables based on the various options selected, which decision tables control received-email processing upon receipt of each sent-by-sender email that is received by the recipient user. FIG. 2 illustrates a possible scenario 40 in which the user/recipient has selected the second-chance function using the out-of-office utility. Scenario 40 includes a set of decision tables 42, which selectively drive the logic of the out-of-office application and process flow table 44, which displays the process of the application as it is being performed over time. As shown in table 44, the out-of-office application is enabled by the user as shown at step 46 and implemented at the server mailbox at 48. When a sent-by-sender email is sent from a sender at step 50 to the user at step 52, and is addressed to the recipient user as the primary addressee, and also as the only addressee, decision table 54 is operative. Decision table 54 performs the second-chance function because that function has been conditionally chosen by the recipient user to be performed under these conditions. According to the received-email processing under the selected second-chance function, an out-of-office responsive email is then sent from the recipient user, as shown at 56, 58. This out-of-office responsive email states the recipient user's limited availability to his email and provides the sender the option to retract, or not retract, the sent-by-sender email. This option will cause the sender to reconsider the posting of the sent-by-sender email. At step 60, the system queries whether or not the sender really wants to, upon reconsideration, post the sent-by-sender email. If the sender answers no, the email is not posted as shown at step 62. If the sender answers yes, the email is sent to the server email at step 64 and forwarded onto the user's local mailbox at step 66. In this scenario, the sender is allowed to get a second chance on whether he wishes to retract the email or have it sent to the recipient's email. To explain the querying process of step 60 more fully, after the out-of-office message has been sent to the sender, the second chance function will pick up the email from the recipient's mailbox and redirect it back to the sender with the option of not posting the message into the recipient's mailbox due to the recipient's limited availability. If the sender decides not to post the message, it will be marked as deleted in the recipient user's server mailbox by the Mail Transfer Agent (MTA) or mail server and the recipient user will not be bothered about this email when he or she returns.

Figure 3:
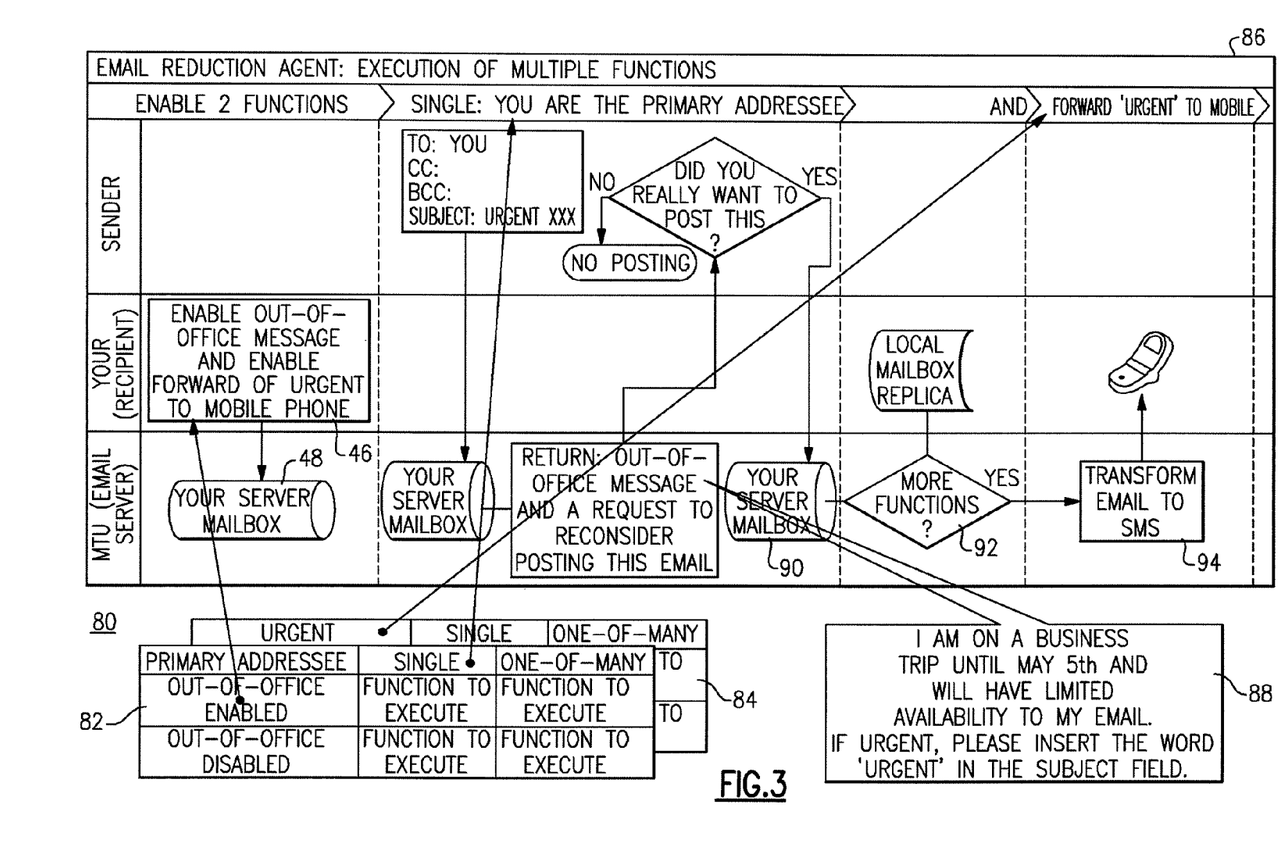
FIG. 3 is a schematic diagram representing a system and/or method embodiment.

FIG. 3 illustrates another possible scenario 80 showing multiple received-email processing functions being performed in response to a single received sent-by-sender email. Decision tables 82 and 84 are activated and the functions are performed as shown in process flow table 86. Decision table 82 (primary addressee table) performs the second-chance function as described in the first scenario above. The out-of-office responsive email communication 88 by the recipient user states that if the email is urgent, the sender should insert the word "urgent" into the subject line. In this example, the sender inserts "urgent" in the subject field, and decision table 84 ("urgent table") is activated. The email message goes to the user/recipient's server mailbox at 90 and due to the word "urgent," the query at step 92 asking whether there are more functions is answered with a yes and decision table ("urgent table") 84 performs the "text message" function at step 94 by transforming the email and sending an SMS text message to the recipient user's mobile phone. In this scenario, the user recipient partially controlled the routing of the message to his cell phone by requesting the sender to insert the word "urgent" in the subject line, by setting "urgent" as an email-related condition and also by selecting text-message as a received-email processing function caused by the "urgent" condition.

The decision tables and scenarios just described in no way limit the embodiments herein. For example, the embodiments include a method and system using generic decision tables related to specific properties of an email such as, the recipient is alone on the Copy-list or one of many, the recipient is alone on the bcc list or one of many, etc. Moreover, users can establish multiple functions utilizing different channels or media, such as, forwarding to a private email address that is enabled for reading email over a VPN or through a secure web-based email client, forwarding to a different person if it is urgent, forwarding the message to a text message over SMS or transforming the message to voice mail. The flexibility offered herein is provided by the use of decision tables, which can be used individually or in combinations.

Figure 4:
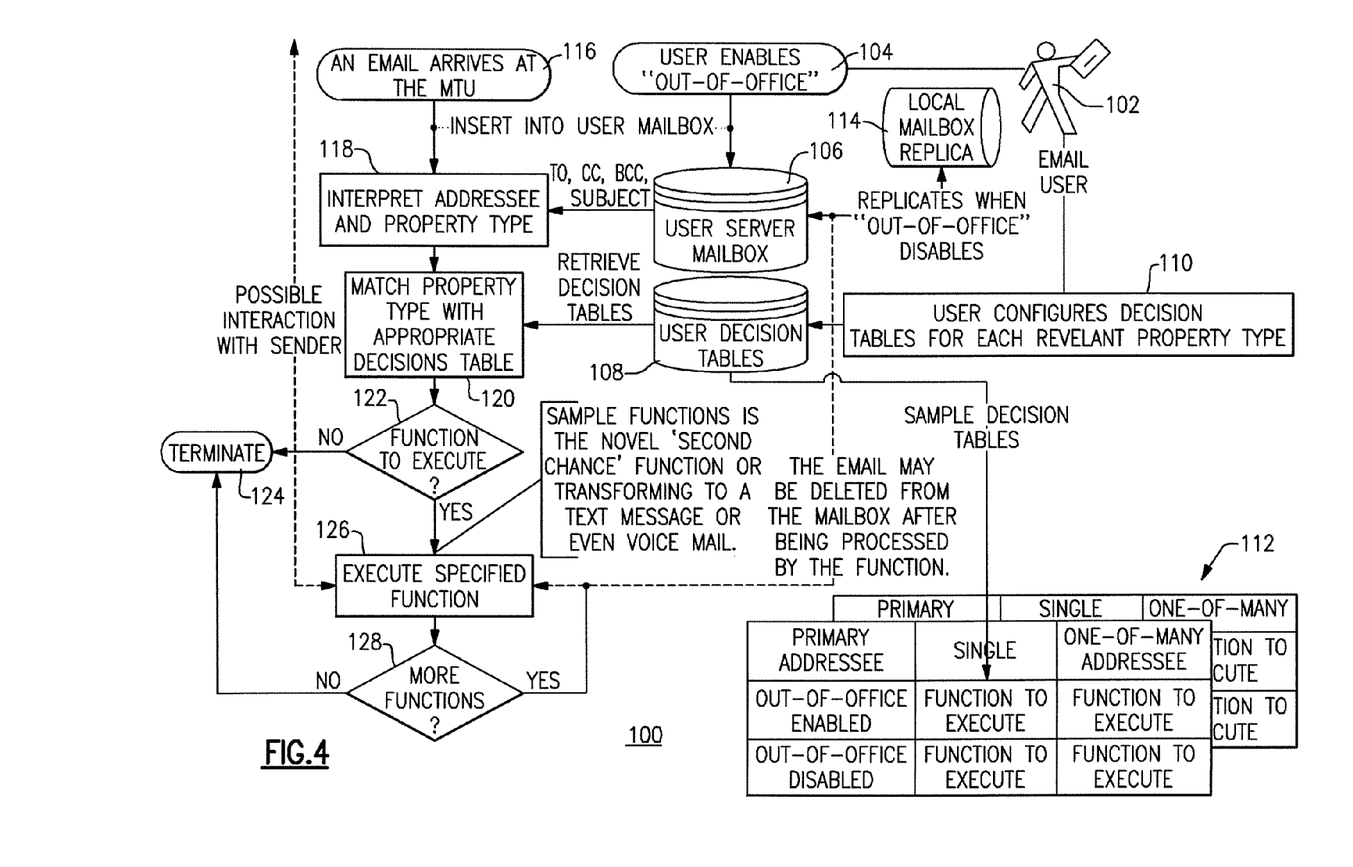
FIG. 4 is a flowchart that shows a method embodiment.

Reference is made to FIG. 4, which displays the logic 100 of method and system embodiments of the invention. The configuration of the out-of-office function is shown on the right side of the drawing, which begins with email user 102 at step 104, enabling the out-of-office function at the user server mailbox 106. As discussed above, the decision tables 108 are configured by user 102 at step 110. Sample decision tables are also shown at 112. The user's server mailbox is replicated at a local mailbox 114.

The performance of the out-of-office function is shown on the left side of the drawing, which begins with an email arriving at the email server, also known as a mail transfer agent (MTA) at step 116. The following step, 118, interprets the addressee and property type, i.e., is the email addressed solely to the user 102 or to the user 102 and others, and in which field (To, Cc, Bcc) is the user placed. At step 120, the property type is matched with the appropriate decision table from the series of decision tables 108, created by user 102. The system queries whether there is a function to perform at step 122. If the answer is no, the process terminates at step 124. If the answer is yes, the process performs the specific function at step 126. The system further queries at step 128 whether there are more functions to perform. If the answer is no, the process terminates at step 124. If the answer is yes, the process performs the specific function. The process continues until there are no longer any more functions to perform.

The embodiments herein provide a variety of options that not only allow a user the immediate delivery of an urgent or important message, when the user is out of the office, but also allows a reduction of build-up or overflow of email in the user's mailbox, when the user is either in or out of the office. Furthermore, the out-of-office function can be used when a user is in the office and has similar needs, e.g., he is not in close access to his email, such as in part of the building not near his office, or he wants to reduce incoming email until a later time.

Figure 5:
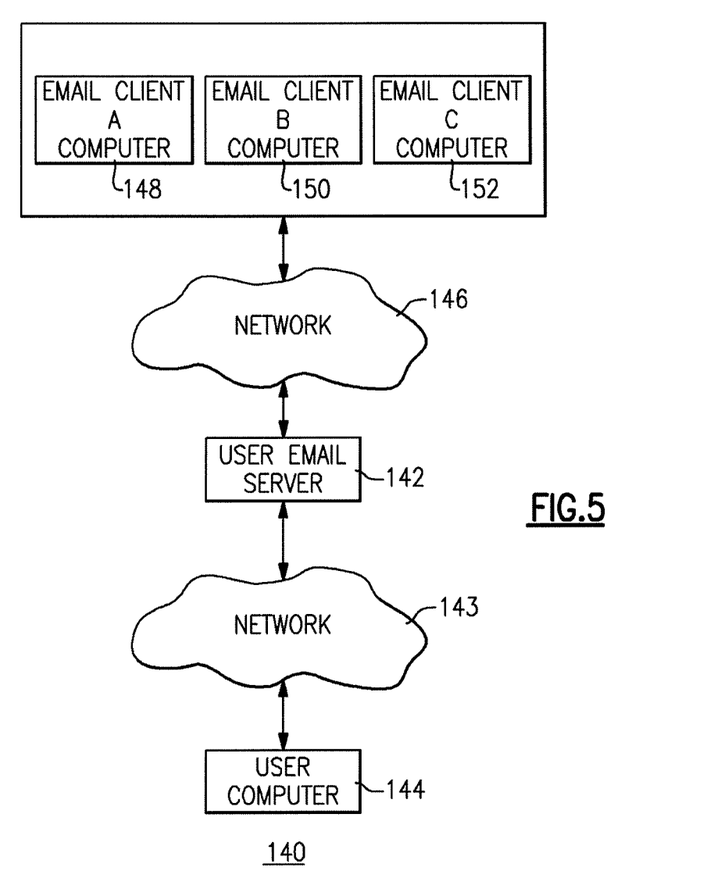
FIG. 5 is a schematic view of a system embodiment.

Reference is made to FIG. 5, which shows system 140. System 140 can include an email server 142 linked to a network 143, such as the internet or an intranet, which is linked to user computer 144. The functions to be performed based on the decision tables are preferably performed at email server 142. A network 146, such as an internet or intranet, links to the email server 142 and to a series of email clients 148, 150, 152, which number is by no means limited hereto.

The system depicted in FIG. 5 is not meant to imply architectural limitations with respect to the embodiments herein. The system herein is fully applicable to hand held devices, such as Blackberry devices, cell phones, personal digital assistants, and other types of devices/machines that support email communication.

Embodiments herein may be implemented within or between one or more computer systems, by performing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, code to provide the recipient with control over routing an email message, code to predefine directions to be performed upon the receipt of an email message, code to perform directions based upon the properties of the email message, code to provide directions to a sender of email; code to transfer the email to a different media.

The embodiments herein provide control of incoming emails to a recipient based on decisions made by the recipient. The sender of an email is given a "second chance" to reconsider sending an email to a recipient who is unavailable for a certain period of time due to business travel or vacation. The amount of messages in a recipient user's mailbox can be reduced by the methods and systems herein.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method for managing email by an email system, the method comprising the following steps:

receiving, from a recipient user having an email account on the email system, a set of predefined instructions regarding second chance processing of a received email, wherein the received set of predefined instructions comprise at least a first condition and a first response associated with the first condition, wherein the first condition is at least one of the following conditions: (i) the recipient user's email address is in a predetermined one of at least two possible addressee fields of the email communication; (ii) the recipient user is a sole receiver of the email communication; and (iii) the received email contains a predetermined keyword, and further wherein the first response is second chance processing of the received email;

receiving, at an email server of the email system, a received email; and processing the received email using the second chance processing only if the first received email meets the first condition;

wherein the processing step includes the following sub-steps:

querying a sender of the first received email regarding retraction of the first received email;

receiving a query response from the sender in response to the query, wherein the response comprises information from the sender regarding whether to retract the received email; and retraction-related processing comprising one of the following two types of processing: (i) retracting the first received email if the information from the sender indicates that the sender has chosen retraction; or (ii) not retracting the first received email if the information from the sender indicates that the sender has not chosen retraction.

2. The method of claim 1 wherein retracting the first received email means putting the first received email in a deleted emails box of an emailbox associated with the recipient user's email account on the email system.

3. The method of claim 1 wherein retracting the first received email means removing the first received email entirely from an emailbox associated with the recipient user's email account on the email system.

4. The method of claim 1 further comprising the step of:

subsequent to the second chance processing step, deactivating, by the recipient user, the second chance processing at the option of the recipient user so that the second chance processing step is not performed for received emails that are received subsequent to performance of the deactivating step.

5. An email system for use by a recipient user, the system comprising an email server computer that comprises:

an activation module structured to receive, from a recipient user having an email account, a set of predefined instructions regarding second chance processing of a received email, wherein the received set of predefined instructions comprise at least a first condition and a first response associated with the first condition, wherein the first condition is at least one of the following conditions: (i) the recipient user's email address is in a predetermined one of at least two possible addressee fields of the email communication; (ii) the recipient user is a sole receiver of the email communication; and (iii) the received email contains a predetermined keyword, and further wherein the first response is second chance processing of the received email;

a receiving module structured to receive an email; and a received-email processing module structured to process the first received email using the second chance processing only if the first received email meets the first condition;

wherein the received-email processing module is further structured to:

query, over the communication network, a sender of the first received email regarding retraction of the first received email;

receive, over the communication network, a query response from the sender in response to the query, wherein the response comprises information from the sender regarding whether to retract the received email; and perform retraction-related processing: (i) retracting the first received email if the information from the sender indicates that the sender has chosen retraction; or (ii) not retracting the first received email if the information from the sender indicates that the sender has not chosen retraction.

6. The system of claim 5 wherein the received-email processing module retracts the first received email by putting the first received email in a deleted emails box of an emailbox associated with the recipient user's email account on the email system.

7. The system of claim 5 wherein the received-email processing module retracts the first received email by removing the first received email entirely from an emailbox associated with the recipient user's email account on the email system.

8. The system of claim 5 wherein the activation module is further structured to allow the first recipient user to deactivate the second chance processing at the option of the recipient user so that the received-email processing module does not perform the second chance processing for received emails that are received subsequent to deactivation of the second chance function by the recipient user.

9. Email software, stored on non-transient storage means and for performance by an email server computer, the email software being for use by a recipient user, the email software comprising:

a setting instruction set programmed to receive, from a recipient user having an email account on the email system, a set of predefined instructions regarding second chance processing of a received email, wherein the received set of predefined instructions comprise at least a first condition and a first response associated with the first condition, wherein the first condition is at least one of the following conditions: (i) the recipient user's email address is in a predetermined one of at least two possible addressee fields of the email communication; (ii) the recipient user is a sole receiver of the email communication; and (iii) the received email contains a predetermined keyword, and further wherein the first response is second chance processing of the received email;

a receiving instruction set programmed to receive a received email; and a received-email processing instruction set programmed to process the received email using the second chance processing only if the first received email meets the first condition;

wherein the received-email processing instruction set is further programmed to:

query, over the communication network, a sender of the first received email regarding retraction of the first received email;

receive, over the communication network, a query response from the sender in response to the query, wherein the response comprises information from the sender regarding whether to retract the received email; and perform retraction-related processing comprising one of the following two types of processing: (i) retracting the first received email if the information from the sender indicates that the sender has chosen retraction; or (ii) not retracting the first received email if the information from the sender indicates that the sender has not chosen retraction.

10. The software of claim 9 wherein the received-email processing instruction set retracts the first received email by putting the first received email in a deleted emails box of an emailbox associated with the recipient user's email account on the email system.

11. The software of claim 9 wherein the received-email processing instruction set retracts the first received email by removing the first received email entirely from an emailbox associated with the recipient user's email account on the email system.

12. The software of claim 9 wherein the activation instruction set is further programmed to allow the first recipient user to deactivate the second chance processing at the option of the recipient user so that the received-email processing instruction set does not perform the second chance processing for received emails that are received subsequent to deactivation of the second chance function by the recipient user.

* * * * *